Inventors
ARTHUR THOMAS AND
ALFRED H. GAUSDEN
By J. L. Sterling
Attorney

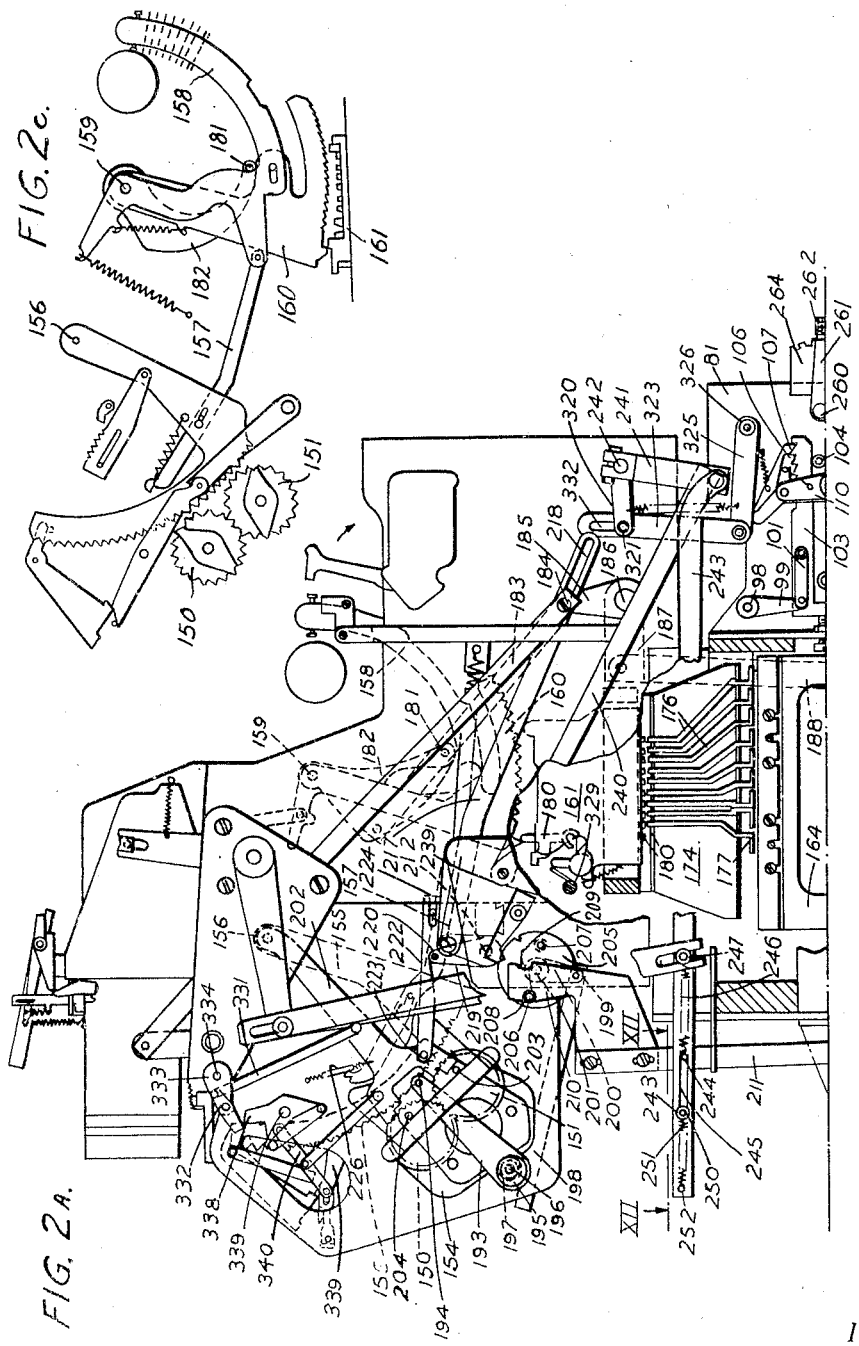

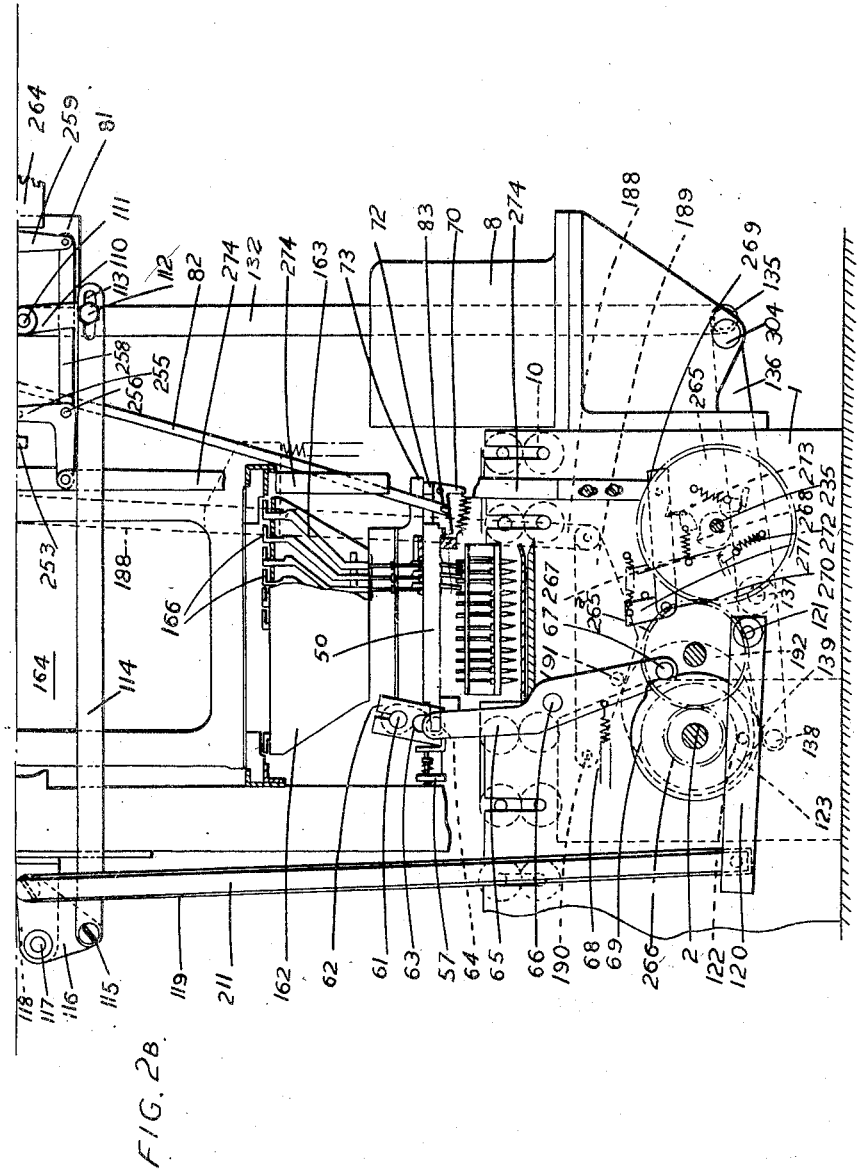

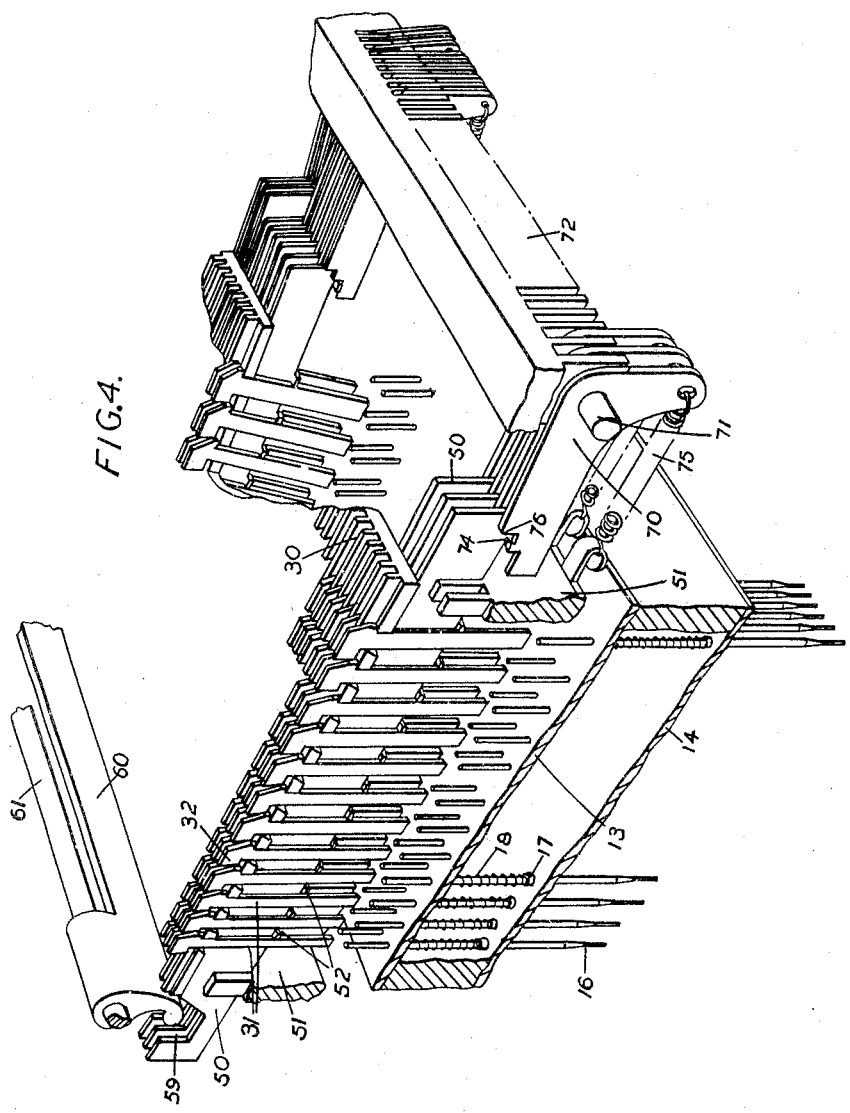

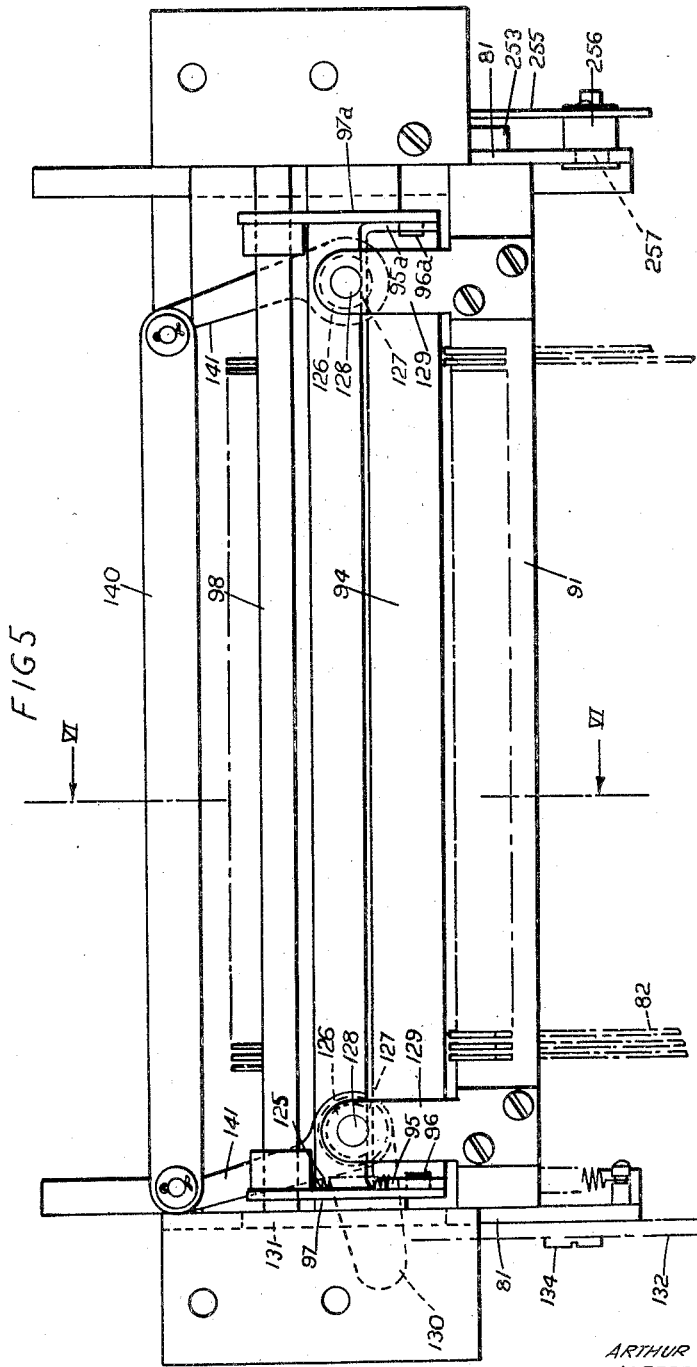

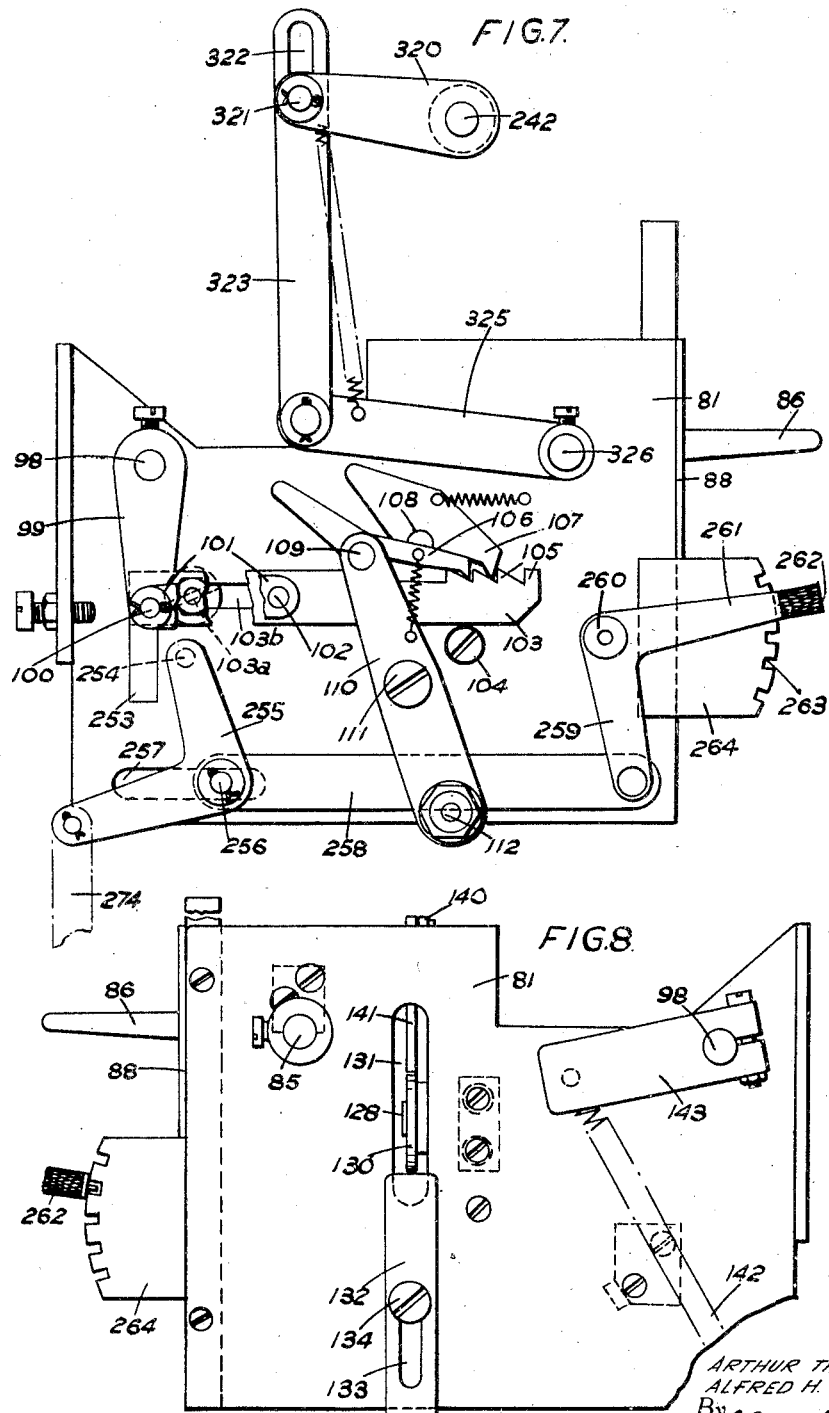

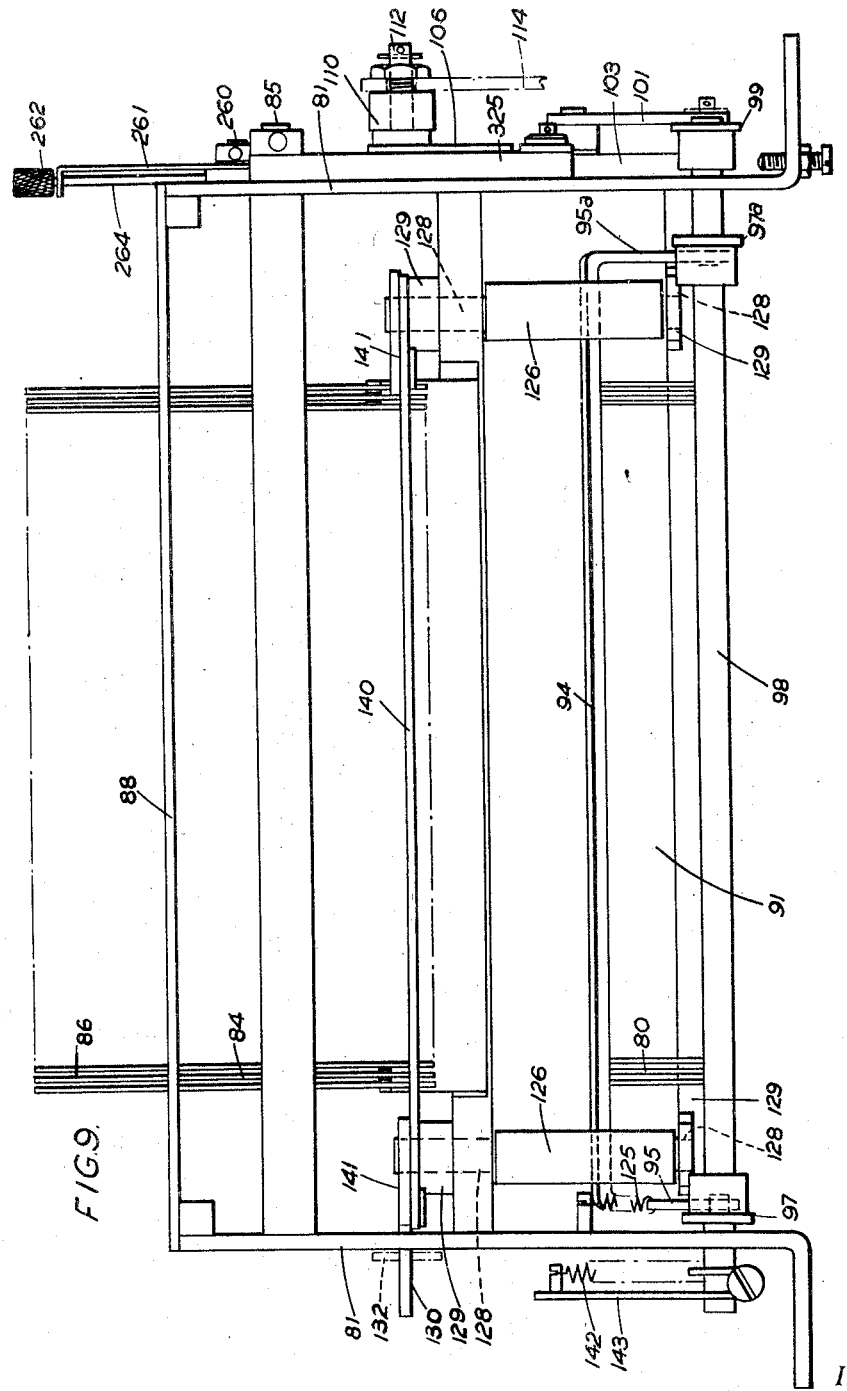

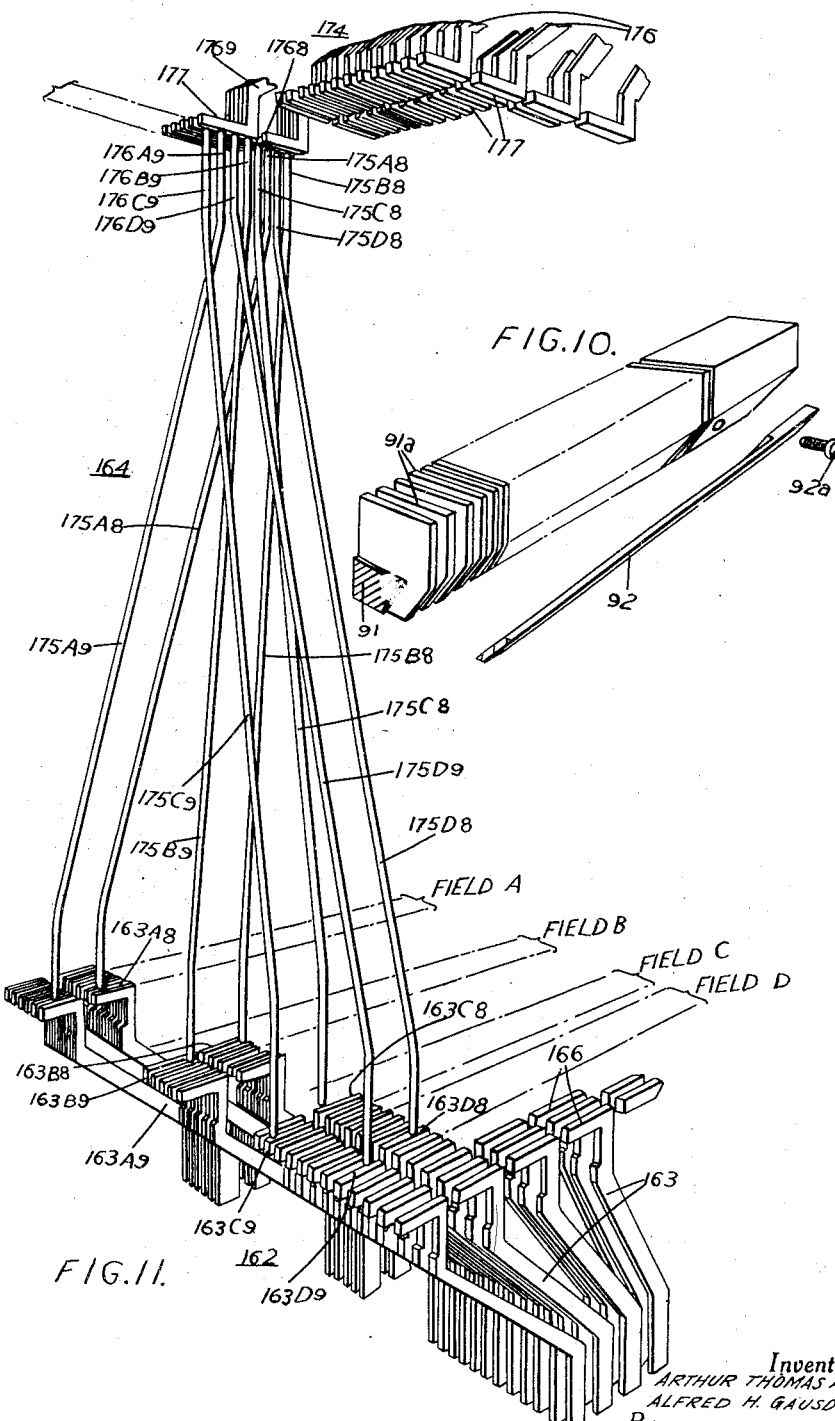

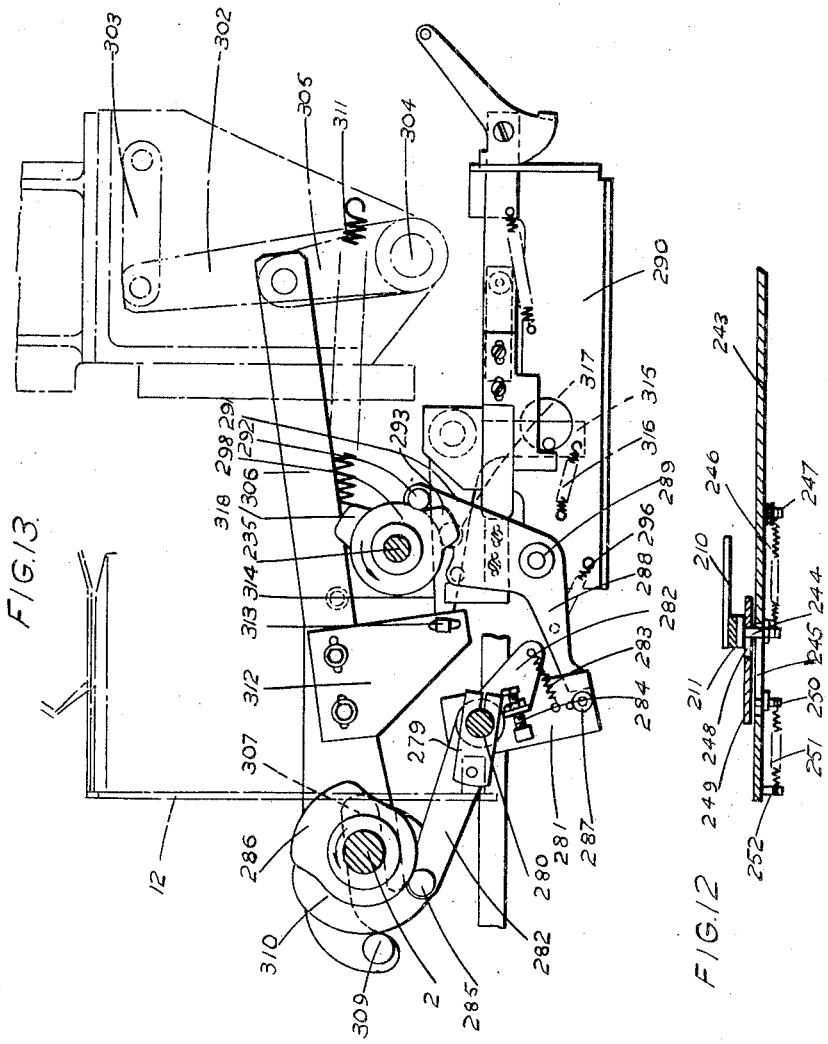

Jan. 31, 1950     A. THOMAS ET AL     2,496,138
RECORD CARD CONTROLLED STATISTICAL MACHINE
Filed March 28, 1945     14 Sheets-Sheet 12
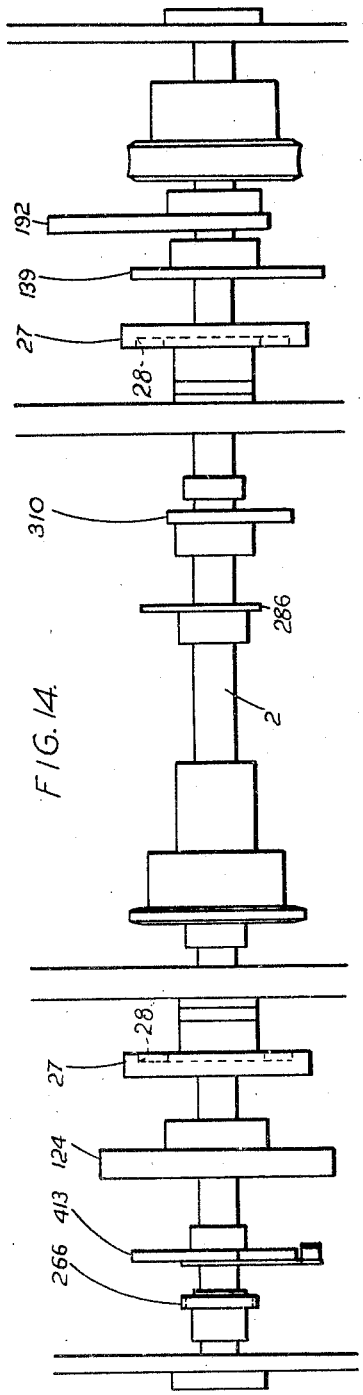
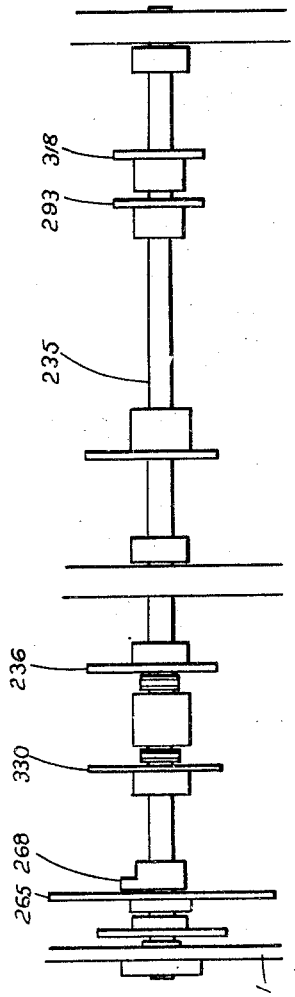
Inventors
ARTHUR THOMAS AND
ALFRED H. GAUSDEN
By John L. Sterling
Attorney

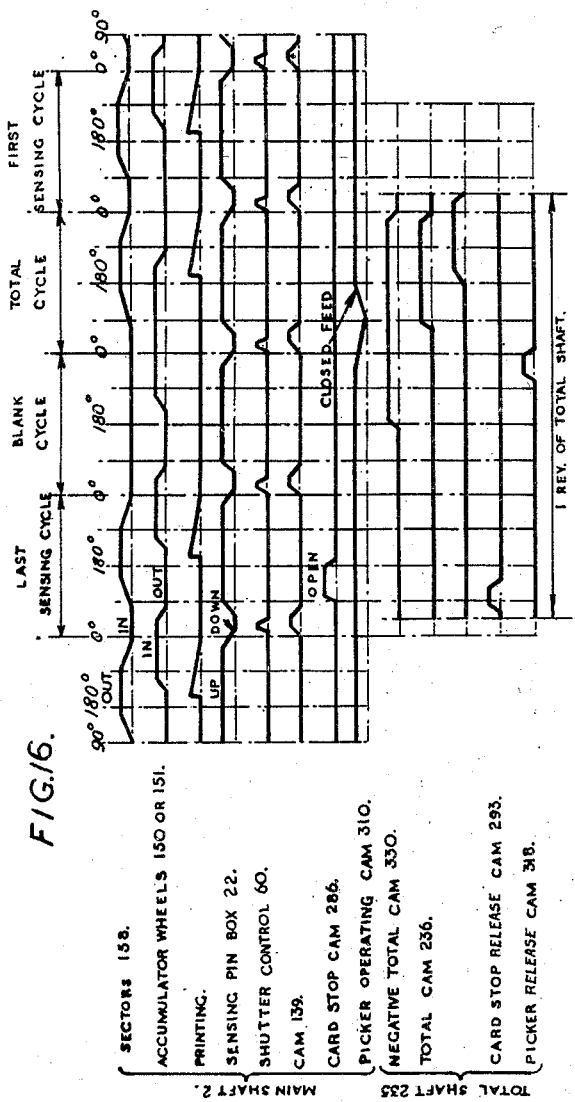

Jan. 31, 1950  A. THOMAS ET AL  2,496,138
RECORD CARD CONTROLLED STATISTICAL MACHINE
Filed March 28, 1945  14 Sheets-Sheet 14

*INVENTORS*
ARTHUR THOMAS AND
ALFRED GAUSDEN
BY *John L. Sterling*

Patented Jan. 31, 1950

2,496,138

UNITED STATES PATENT OFFICE 2,496,138

RECORD CARD CONTROLLED STATISTICAL MACHINE

Arthur Thomas, Wallington, and Alfred Herrmann Gausden, Chipstead, England, assignors to Powers-Samas Accounting Machines Limited, a British company Application March 28, 1945, Serial No. 585,250
In Great Britain March 30, 1944

13 Claims. (Cl. 235—61.6)

This invention relates to sensing mechanism for record card controlled statistical machines of the kind provided with means for sensing a card in sections and for transmitting the items sensed in each section to a single accumulator and has for its object to increase the flexibility of control of such machines.

According to the present invention in a machine of the above kind, means is provided for selecting, for sensing, one or more of the total number of sections of the card together with means for predetermining the order in which said selected sections shall be sensed.

Preferably a machine according to the invention comprises the combination with a reciprocating pin box for sensing the cards and means for holding a card stationary in the pin box during a number of consecutive reciprocations thereof, of controls operable to render a different section of the pin box operative in each of said consecutive reciprocations, a further control settable to vary the order in which said sections shall be operative, and an accumulator associated with transmission means from each section of the pin box, whereby an item in each of a number of sections of the record can be sensed and the items accumulated.

In order to reduce the number of the idle cycles of the machine means is preferably provided for controlling the card feed in accordance with the number of sections to be sensed so that the number of consecutive reciprocations of the pin box during which a card is retained with it depends upon the number of sections to be sensed.

The machine may be used to add up a number of items all relating to a particular job, each item being punched in a different field of one card, and in such constructions means may be provided according to a feature of the invention, for controlling the total taking mechanism of the machine in accordance with the number of sections or fields of the card which have to be sensed so that whatever the number of sections a total is always taken immediately the last section has been sensed. Through the use of a punch mechanism shown in copending application of Arthur Thomas et al., filed March 28, 1945, S. N. 585,316, now Patent No. 2,401,671, for improvement in Record controlled statistical machines, the totals may be punched in a summary card.

In order that the invention may be more completely understood a preferred embodiment thereof will now be described with reference to accompanying diagrammatic drawings which illustrate a machine for sensing a number of positive and/or negative items from a single card accumulating the total of said items.

In the accompanying drawings—

Figs. 1A and 1B together form an outside right hand elevation of the machine;

Figs. 2A and 2B show the machine in right hand elevation with certain parts removed to show others behind them;

Fig. 2C shows the sectors and other related parts shown in broken lines in Fig. 2A;

Fig. 4 is a part perspective view of the sensing mechanism and control devices therefor;

Fig. 5 is a rear view of the mechanism for controlling the order in which the respective fields of the cards are sensed;

Fig. 7 is a right hand elevation of the mechanism shown in Fig. 5;

Fig. 8 is a left hand elevation of said mechanism;

Fig. 9 is a plan of said mechanism;

Fig. 10 illustrates a detail of the mechanism shown in Fig. 6;

Fig. 11 is a diagram illustrating the wiring of the connection box through which the sensing pins set stops in the stop basket of the machine;

Fig. 12 shows a detail of the accumulator control mechanism, being a section plan on the line XII—XII of Fig. 2A;

Fig. 13 is an elevation of the card stop and card picker control mechanism;

Fig. 14 shows the main shaft of the machine with its cams in elevation;

Fig. 15 shows the total shaft;

Fig. 16 is a timing diagram;

In the drawings like references indicate the same or similar parts.

Figure 1A:
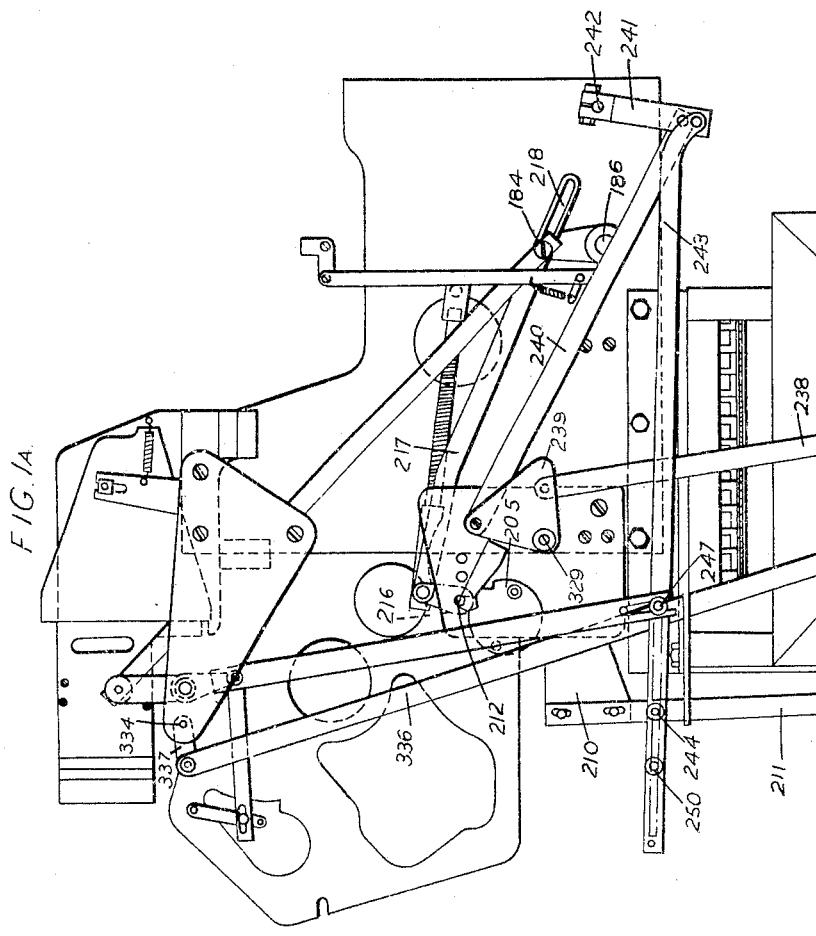

In the embodiment illustrated in the drawings the machine comprises a base section 1, (Figs. 1B, 2B, and 3) housing the main shaft 2 which is driven continuously from an electric motor (not shown).

Also mounted in the base section is the card magazine 8 from which the cards are fed seriatim by a picker 9, of which the operation will be described later, to feed rolls 10 which convey each card in turn between fixed sensing-pin plates 11, between which it is arrested by a card stop 12.

The sensing pin box is of the general construction described in British patent specification No. 401,012 or in United States Patent No. 2,290,827 issued to Arthur Thomas July 21, 1942, and is driven in the manner described in said U. S. patent.

The lower reciprocating portion of the pin box comprises upper and lower pin plates 13 and 14 (Fig. 3) connected at each end by transverse bars 15, the plates 13 and 14 being provided in the usual manner with holes for reception of the sensing pins 16. Each pin 16 has a collar 17 resting on the lower pin plate 14 and has a spring 18 tending to press the pin downwardly.

The pin box is operated by the following mechanism:

The two transverse bars 15 are connected at each end by a casting 19 (Fig. 1B) which has a boss 20 whereby the movable part of the pin box is guided for reciprocation on a post 21 fixed to the frame of the base of the machine.

Pivoted to each of the castings 19 at 22 is a link 23 pivoted at its lower end 24 to an arm 25 pivoted to the base of the machine at 26.

Secured to the shaft 2 is a pair of cam discs 27 (see also Fig. 14) in each of which there is formed a cam track 28 (Fig. 1B) engaging with a roller 29 of the corresponding arm 25, whereby the castings 19 and therefore the lower portion of the pin box are reciprocated once for each revolution of the shaft 2.

Below the pins 16 are located the fixed pin plates 11, between which the card is fed by the feed rolls 10, to which the cards are delivered from the magazine 8 by the picker 9 which is reciprocated by mechanism which will be described later.

In the manner described in British specification No. 401,012 the upper fixed part of the pin box includes a plate 30 (Figs. 3 and 4) having slots through which pass the intermediate elements 31 which are suspended by their heads 32 from the plate 30. The plate 30 extends between two side plates 33 which support it, said plates 33 being connected by two transverse bars 34.

Also secured to the transverse bars 34 are two fixed pin plates 35 having holes through which pass the transmission rods 36 (corresponding to the rods 18 shown in British specification No. 401,012).

Each rod 36 has a collar 37 and a spring 38 which pushes it downwardly, and the lower end of each rod 36 bears on the head 32 of the corresponding intermediate transmission element 31. As described in British specification No. 401,012 each rod 36 is off-set with respect to the intermediate transmission element 31, and the corresponding spring 38 tends to rock the transmission element 31 clockwise (Fig. 3) about its head 32.

In British specification No. 401,012 there is described a shutter 26 and in the present construction this shutter 26 is replaced by a shutter 50 individual to each column of sensing pins. Each of these shutters 50 is in the form of a slide mounted at each end in comb bars 51 and carrying a series of lugs 52 each engaging one of the intermediate pins of the associated column (see Figs. 3 and 4).

Figure 3:
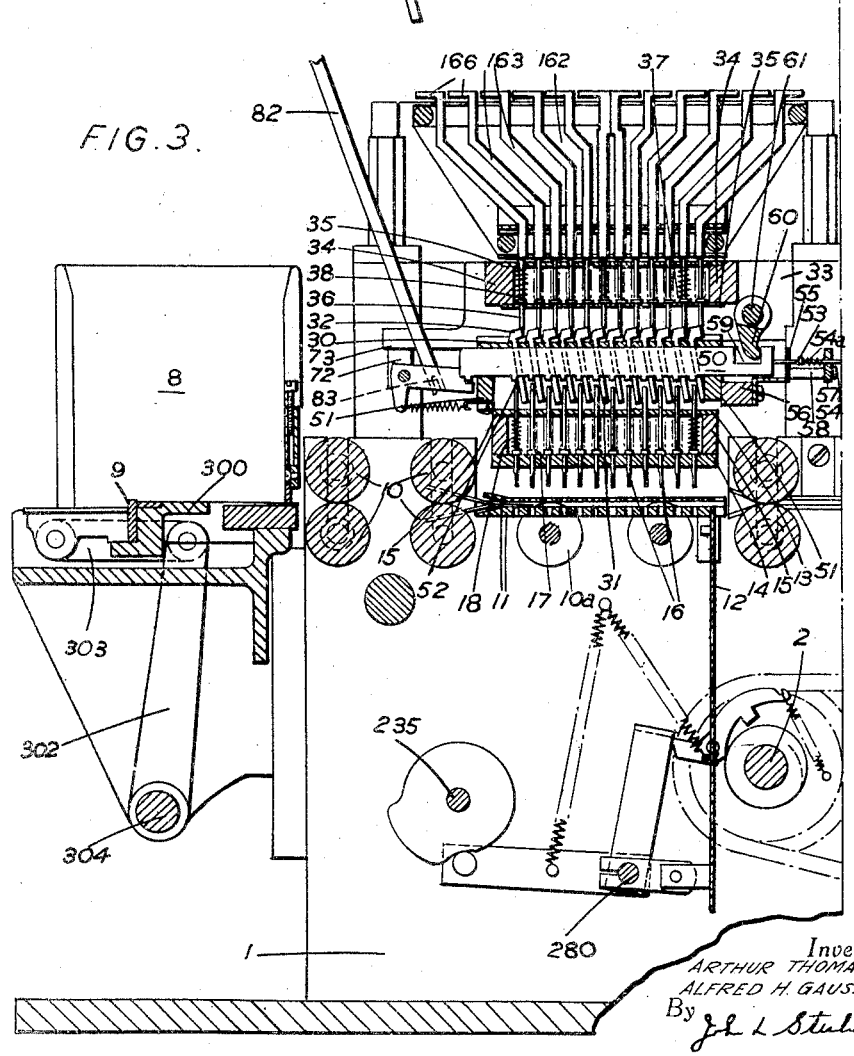
Fig. 3 shows a longitudinal section of the base mechanism of the machine to a larger scale.

Each shutter 50 is urged to the left in Fig. 3 by an individual spring 53 surrounding a pin 54 guided in a plate 55 fixed to a member 56 of the pin box and in a plate 57 secured to the plate 55 by horizontal posts 58 (one shown in Fig. 3). The spring 53 is compressed between the plate 57 and a collar 54a on the pin 54 whereby the pin 54 is urged against the right hand end of the shutter 50 in Fig. 3.

For the purpose of restoring the shutters 50 a common restoring bail 60 is provided, which is secured to an operating shaft 61, mounted in the fixed frame of the pin box, and engages in a recess 59 in each shutter 50. Also secured to the shaft 61 is an arm 62 (Fig. 2B) having a slot 63 in its free end, with which engages a pin 64 on a lever 65 pivoted to the base side plate at 66 and carrying at its lower end a roller 67 maintained by a spring 68 in engagement with a cam 69 secured to the mainshaft 2.

At each revolution of the main shaft 2 the cam 69 rocks lever 65 counterclockwise (Fig. 2B) and shaft 61 clockwise thereby restoring to the left in Fig. 2B any of the shutters 50 which have been allowed to move over to the right in the manner described below.

Each shutter 50 is provided with an individual latch 70 (Figs. 2B, 3, and 4) all said latches being pivoted on a common shaft 71 and guided in a comb bar 72 in which said shaft is mounted, the comb bar depending from a forward extension 73 of the pin box frame.

The latches 70 pass between adjacent shutters 50 and each latch cooperates with a laterally projecting lug 74 formed on the associated shutter.

Each latch 70 is urged clockwise into latching position by a spring 75 and when in latching position a shoulder 76 on the latch engages the lug 74 on the shutter and prevents movement of the latter to the left in Fig. 3 even when the restoring bail 60 swings clockwise, each recess 59 being made wide enough to allow movement of the bail 60 therein even though the shutter may be held by its latch.

Figure 6:
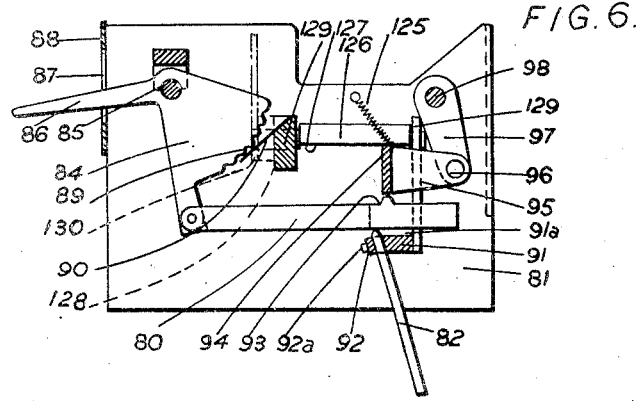
Fig. 6 is a section to a smaller scale on the line VI—VI of Fig. 5.

Associated with each shutter latch 70 is a horizontal latch control slide 80, these slides being mounted inside a frame 81 (Figs. 2A, 2B and 5 to 9) attached to the forward face of the machine frame above the card magazine 8. Each control slide 80 rests at its rearward end of the rounded upper end of a link 82, of which the lower end is forked and passes over a pin 83 on the respective latch 70. At its forward end each control slide 80 is pivoted to a manually operable control plate 84 pivoted on a shaft 85 mounted in the frame 81 and carrying a handle 86 projecting through a slot 87 in a front plate 88 (Fig. 6). Each control plate 84 is formed with detent teeth 89 with which engages a spring detent 90 to locate the plate 84 in the position to which it has been set by the handle 86.

At their rear ends the slides 80 are also guided in a comb comprising a bar 91 carrying comb plates 91a, shown in detail in Fig. 10, said comb bar also guiding the upper ends of the links 82 which are retained by a plate 92 attached at each end by screws 92a to the comb bar 91.

Each control slide 80 has a lug 93 (Fig. 6) on its upper edge and by manipulating the handles 86 each slide can be set individually to bring its lug into any one of five consecutive positions with relation to an actuating bail 94 which is common to all the slides 80.

This bail 94 is carried between two arms 95, 95a pivoted at 96, 96a to respective arms 97, 97a secured to a shaft 98 freely mounted in the frame 81 and having secured to it, outside said frame on the left hand side (Figs. 2A and 7) an operating arm 99 pivoted at its free end 100 to a short link 101 which in turn is pivoted at 102 to a ratchet bar 103 freely supported at one end on a roller 104 rotatable on a fixed stud, and carrying at its other end a pin 103a sliding in a slot 104b in the frame plate 81.

The ratchet bar 103 has four teeth 105 with which cooperate an actuating pawl 106 and a detent pawl 107 the latter being pivoted to frame 81 at 108, while said actuating pawl is pivoted at 109 on the upper end of a lever 110 pivoted to the frame 81 at 111 and carrying at its lower end a pin 112 engaging in a slot 113 in a horizontal link 114 (Figs. 2B and 9). This link 114 is pivoted at its rear end 115 to a bell crank plate 116 pivoted at 117 to a bracket 118 secured to the back of the main frame of the machine, said plate 116 being connected by a link 119 to a lever 120 pivoted to the base frame at 121 and carrying a roller 122 engaging in a track cam 123 formed in a disc 124 (Fig. 14) secured to the mainshaft 2.

Accordingly at each revolution of the mainshaft 2 the cam 123 rocks the lever 120 counterclockwise (Fig. 2B) whereby link 114 is moved to the left thereby rocking lever 110 clockwise and causing pawl 106 to move the ratchet bar 103 forwardly one tooth space.

This movement of ratchet bar 103 is transmitted through link 101 and arm 99 to shaft 98 which is accordingly rocked counterclockwise in Fig. 7 (clockwise in Fig. 6) against spring 142 attached to arm 143 on shaft 98 (Fig. 8) thereby moving the bail 94 forwardly (to the left in Fig. 6) one step.

Thus in successive revolutions of the mainshaft 2 the bail 94 is advanced step by step from its normal or rearmost position to its foremost position (from right to left in Fig. 6) the maximum number of positions of the bail being five. The action which occurs when the bail has been advanced to its foremost position will be described later.

In each of the five positions which the bail 94 can occupy during successive revolutions of the mainshaft 2 the said bail is depressed by the following mechanism.

The bail 94 is held up by a spring 125 against two cams, each comprising a cylinder 126 (Figs. 5, 6 and 9) formed with a flat 127 thereon, said cams having trunnions 128 by which they are rotatably mounted in brackets 129 carried by the frame 81.

Secured to the forward trunnion 128 of the right hand cam 126 is an arm 130 projecting through a slot 131 in the right hand side of the frame 81 and overlying the upper end of a push rod 132 (Figs. 2B, 8 and 9) guided at its upper end by means of a slot 133 engaging a stud 134 carried by the frame 81, the lower end of said push rod being pivoted at 135 to a lever 136 pivoted at 137 to the base frame and carrying at its other end a roller 138 cooperating with a cam 139 secured to the mainshaft 2.

At each revolution of the mainshaft 2 the cam 139 lifts the push rod 132 rocking the cams 126 whereby the bail 94 is depressed. The two cams 126 are connected by a link 140 extending between arms 141 secured to said cams.

As already explained each latch control slide 80 has a lug 93 which can be set into any one of five consecutive positions with relation to the bail 94. Four of these positions correspond respectively to the four positions of the bail 94, while the fifth position is idle.

As will be explained later the bail 94 is not always permitted to move as far as its fourth position, but assuming that it is so permitted, and considering the four consecutive revolutions of the mainshaft 2 which are involved, then:

In the first revolution the bail 94 will be in its first position, and on being depressed, will engage the lugs 93 of any slides 80 which have been set in the first position thereby releasing the latches 70 for the corresponding shutters 50 and rendering the corresponding columns of sensing pins operative to sense one field of the card.

In the second revolution the bail 94 will be in the second position, and will engage the lugs 93 of any slides 80 which have been set in the second position, thereby releasing the corresponding latches 70 and permitting the associated columns of sensing pins to sense another field of the card.

Likewise in the third and fourth revolutions the bail 94 will effect release of the latches 70 whose slides 80 have been set in the third and fourth positions respectively.

In the upper part of the machine is an adding and printing mechanism including an adding and subtracting accumulator of the kind described in British patent specification No. 405,666 or in U. S. Patent No. 2,364,934 issued December 12, 1944.

The accumulator (Figs. 2A and 2C) comprises denominational pairs of registering wheels 150 and 151, the wheels 150 being for addition and the wheels 151 for subtraction. The wheels 150 and 151 are constantly in mesh with one another and are mounted in a cradle 154 which is the same as the cradle 61 described in British specification No. 405,666. Associated with each pair of registering wheels 150, 151 is a toothed actuating sector 155 pivoted to the machine frame at 156 and connected by a link 157 (equivalent to link 4 in British specification No. 405,666) to a corresponding denominational type carrier 158 which is pivoted on a fixed shaft 159.

Each type carrier 158 is operated in the well known manner by a corresponding toothed sector 160, also pivoted on the shaft 159.

The sectors 160 are set from the stops of a stop basket 161 of which the construction is the same as that described in British patent specification No. 483,234 (U. S. specification No. 2,242,095).

In the particular construction now being described there is a maximum of four fields which may be sensed, and corresponding columns of sensing pins in each of the four fields are connected in the manner described below to actuate a single column of stops in the stop basket 161.

Above the transmission rods 36 of the sensing pin box is disposed a fixed lower connection box 162 (Figs. 2B and 3) of which the wires 163 are splayed out to space them wider apart at the top than at the bottom. Above the lower connection box 162 is an intermediate connection box 164 (Figs. 1B and 2B) which is removable so that it can be replaced by another box when it is desired to change the connections between the pin box and the stop basket.

Above the intermediate connection box 164 is an upper fixed connection box 174 (Fig. 2A) which effects the transmission from the intermediate connection box to the stop basket 161.

In Fig. 11 the connections between the lower connection box 162 and the upper connection box 174 are shown diagrammatically. The lower connection box is divided into four fields, A, B, C, and D in accordance with the arrangement of fields on the card. Considering, for example, field A, it will be seen that the No. 9 wire 163A9 in the lower box 162 is connected by an intermediate connection box wire 175A9 to the No. 9 wire 1769 in the fifth column of the upper connection box 174 (i. e. the fifth column from the left in Fig. 11). In the second field B, the No. 9 wire 163B9 is connected by the intermediate connection box wire 175B9 also to the No. 9 wire 1769 in the fifth column of the upper box 174, and in like manner through intermediate wires 175C9 and 175D9, the No. 9 wires 163C9 and 163D9 in fields C and D respectively of the lower box are also connected to the No. 9 wire 1769 in the fifth column of the upper box.

In order that this one wire 1769 may thus be actuated by any one of the four intermediate wires 175A9, 175B9, 175C9, 175D9, the upper box wire 176 is formed with an extended foot 177 which overlies the tops of all the four intermediate wires which operate it. Also in order to permit the lower ends of the intermediate wires to be accommodated each lower box wire 163 is formed with an extended head 166.

By means of similar intermediate wires 175 the No. 9 wire 163 in the second column of each of the four fields is connected to the single No. 9 wire 176 in the next column of the upper box, and so on for the other No. 9 wires 163 in the lower box.

In the same way corresponding value positions in each of the four fields are connected to a single value position in the upper box.

In the diagram of Fig. 11 only one other set of wires is shown, being that for the No. 8 wires 163A8, 163B8, 163C8 and 163D8 in the second column of each of the four fields, and it will be seen that the intermediate wires 175A8, 175B8, 175C8, 175D8 connect these four No. 8 wires of the lower box to the single No. 8 wire 1768 in the fourth column of the upper box, (fourth from left in Fig. 11).

Accordingly when any sensing pin is raised the corresponding lower box wire 163 is thereby raised, which in turn lifts the intermediate wire 175 thereby raising also the upper box wire 176 under which the upper end of said intermediate wire is disposed. The upper box wire 176 in turn lifts the corresponding stop 180 in the stop basket 161.

Figure 19:
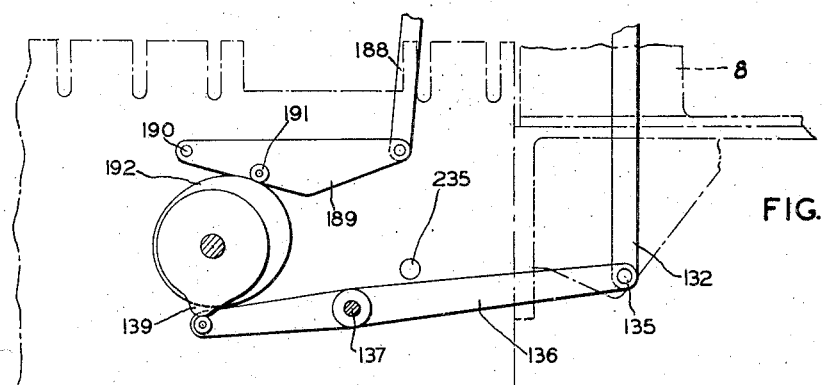
Fig. 19 is a sectional view of sector restoring bar actuating mechanism outside the right hand machine frame and shown broken lines in Fig. 2B.

The sectors 160 are held in their restored positions by a restoring bar 181 (Fig. 2A) similar to that described in U. S. patent specification No. 2,242,095, the restoring bar being carried between arms 182 pivoted on the shaft 159 and actuated by a link 183 pivoted at 184 to an arm 185 secured to a shaft 186. Shaft 186 is oscillated from the main shaft 2 by means of an arm 187 secured to the shaft 186 and connected by a link 188 (see also Fig. 19) to a lever 189 pivoted to the machine frame at 190 and of which the other end carries a roll 191 engaging a cam 192 secured to the mainshaft 2.

In order to control the engagement of the accumulator wheels 150 and 151, with the sectors 155, mechanism similar to that described in U. S. specification No. 2,364,934 is provided to move the cradle 154. This mechanism comprises a link 193 pivoted to the cradle at 194 and engaging at its lower end an eccentric 195 fixed to a shaft 196 on which is secured a pinion 197 engaging with a rack 198. The other end of the rack is pivoted at 199 to an arm 200 secured to a shaft 201 which is the same as the shaft 59 in U. S. A. specification No. 2,242,095.

As described in British specification No. 405,666, an abutment member 202 cooperates with the cradle 194 to determine whether the positive or negative wheels shall engage with the sectors 155. In the position shown in Fig. 2A the abutment member 202 is in its clockwise position so that the pin 203 on the cradle is in engagement with the lower fork of the abutment member. If now the eccentric 195 is rotated, the cradle will be pushed upwardly and will tilt about the pin 203 to bring the positive wheels 150 into engagement with the sectors 155.

If, however, the member 202 is swung to its counterclockwise position then the pin 204 on the cradle will be in register with the upper fork arm of member 202 and on rotation of eccentric 195 the cradle will tilt to bring the negative wheels 151 into engagement.

In order to operate the shaft 201 the same has secured thereto a disc 205 carrying two pins 206, 207 cooperating respectively with slots 208, 209 in the head 210 of a vertical link 211 (Fig. 2B) the lower end of which link is pivoted to the lever 120 which is actuated by the cam 123 already referred to.

During card reading cycles of the machine the link 211 is held over to the left in Fig. 2A by mechanism which will be described later, and in this position of link 211 the slot 208 remains in engagement with the pin 206.

The timing of cam 123 is such that at 0° in the cycle the accumulator wheels are in engagement with the sectors 155, and before the restoring bar 181 moves out, the link 211 moves down, thereby rocking shaft 201 counterclockwise to bring the wheels out of engagement. The restoring bar 181 then releases the sectors 160 to take a setting from the stops 180 and the link 211 is raised and rocks the shaft 201 clockwise (Fig. 2A) whereby the rack 198 acting through pinion 197 rocks the shaft 196, also clockwise whereby the cradle 154 is tilted to cause engagement of wheels 150 or 151 with the sectors 155 after the latter have been set.

The restoring bar 181 then returns the sectors to normal position whereby the amount to which they were set is transferred to the accumulator wheels in the manner described in U. S. A. Patent No. 2,364,934.

Figure 1B:
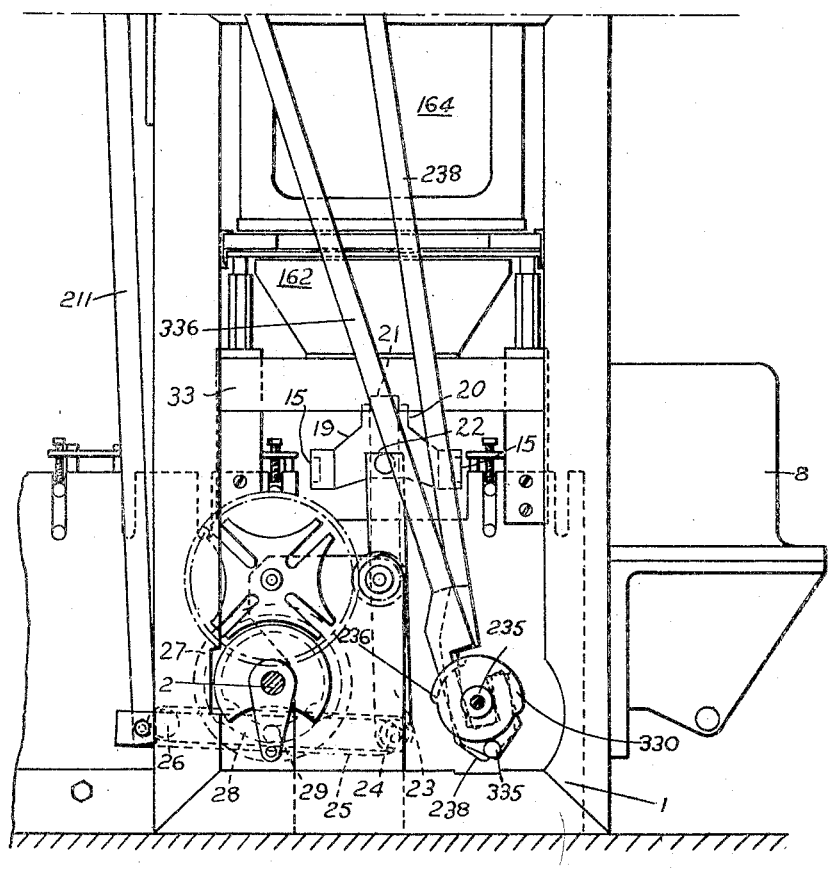

In order to determine whether the positive or negative wheels shall engage the sectors 155, a shaft 212 is provided which is normally held in the position shown in Figs. 1A and 2A by means of a latch (not shown). Said latch is the same as the latch 90 described in U. S. specification No. 2,364,934. Shaft 212 also carries fixed thereto an arm 216 (Fig. 1A) having pivoted to it a link 217 of which the other end has a slot 218 engaging the pin 184 on the arm 185.

Also fixed to shaft 212 is a second arm 219 (Fig. 2A) carrying a pin 220 standing in front of a lug on a link 222 which at one end 223 is pivoted to the abutment member 202, and at the other end is formed with a slot 224 engaging over a fixed pin (not shown). As long as the shaft 212 is held by the latch, the pin 220, by engaging the lug of link 222, prevents the member 202 from rocking clockwise under the action of its spring 226, and at each oscillation of shaft 186 the pin 184 merely slides idly along the slot 218.

When the card having a debit hole punched therein is sensed, a sensing pin (not shown) positioned to read the debit hole, operates mechanism described in U. S. specification No. 2,364,934 to withdraw the latch and release shaft 212.

Consequently, when shaft 186 rocks clockwise the link 217 follows its movement and shaft 212 rocks clockwise also, so that pin 220 pulls the link 222 over to the right and brings the member 202 into the subtraction position, so that the negative or subtraction wheels 151 engage with the sectors 155.

Rotatably mounted in the base of the machine is a shaft 235 (Figs. 1B and 2B) hereinafter referred to as the total shaft, which is the same as shaft 96 in U. S. specification No. 2,242,095. Fast on said shaft 235 is a cam 236 with which engages a roll on a link 238 connected through a bell crank plate 239 (Fig. 1A) secured to the back total shaft 329 and link 240 to an arm 241 secured to the front total shaft 242 whereby the latter is rocked.

Pivoted to said arm 241 is a link 243 hereinafter referred to as the side total link (member 127 in U. S. specification No. 2,242,095) which serves to position the vertical link 211.

Link 211 carries a pin 244 (Figs. 2A and 12) projecting through a slot 245 in link 243, hereinafter referred to as the side total link, which is pivoted to the arm 241 on the front total shaft 242, the pin 244 being connected by a spring 246 to a pin 247 on link 243. The pin 244 (Fig. 12) also passes through a slot 248 in a slide 249 carrying a pin 250 passing through slot 245 and connected by spring 251 to a pin 252 on link 243.

During card reading cycles the link 243 is over to the left on the position shown in Fig. 2A and the springs 246 and 251 maintain the link 211 also to the left, in which position the slot 208 remains in engagement with the pin 206.

During adding cycles of the machine the cards are held in the sensing position between the pin plates 11 by the card stop 12 for as many cycles as there are fields to be sensed on the card, and in each cycle the item read from the respective field is entered into the accumulator wheels 150 or 151. When the last field has been sensed, the total shaft 235 is caused to make one revolution, the card stop is withdrawn, whereby the card is ejected by skid rolls 10a, and the card picker 9 is actuated to feed the next card. Also the total is punched in the card from which the items were read. The mechanism for carrying out these operations will now be described.

It has already been explained that at each machine cycle the ratchet bar 103 is advanced one step by means of the pawl 106. The ratchet bar 103 carries a downwardly directed lug 253 at its rear end (Fig. 7) which cooperates with a pin 254 on one arm of a bell crank 255 pivotally mounted on a pin 256 which is slidable in a slot 257 in one of the frame plates 81 and is connected by a link 258 to one arm 259 of a bell crank pivoted to the frame 81 at 260 and of which the other arm 261 constitutes a positioning lever for the bell crank 255. The arm 261 carries a spring loaded knob 262 provided with a tooth (Fig. 8) engageable with any one of five notches 263 in a plate 264. By moving the arm 261 until its tooth engages with a desired one of the notches 263 the pin 256 can be moved along the slot 257 and the bell crank 255 positioned so that its pin 254 is in position to be engaged by the lug 253 on the ratchet bar 103, on the latter moving into any one of the five positions which it can occupy. In the fifth position of the bell crank 255 the pin 254 is out of reach of the lug 253 whereby the device is cut out of operation.

Thus if all four fields on the card are to be sensed the bell crank 255 will be positioned so that when the ratchet bar 103 moves from the fourth to the fifth position its lug 253 will engage the pin 254 and rock the bell crank 255.

On the other hand if only two fields on the card are to be sensed then the bell crank 255 will be positioned so that it is rocked by the ratchet bar 103 on the movement of the latter from the second to the third position.

The rocking of the bell crank takes place early in the cycle in which the second field is to be sensed and brings about one revolution of the total shaft 235 by means of the following mechanism.

Figure 17:
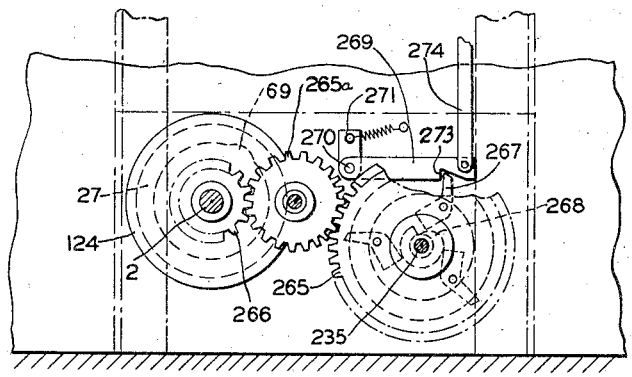
Fig. 17 is a sectional view of the total shaft drive control mechanism taken along lines 17—17 of Fig. 18.
Figure 18:
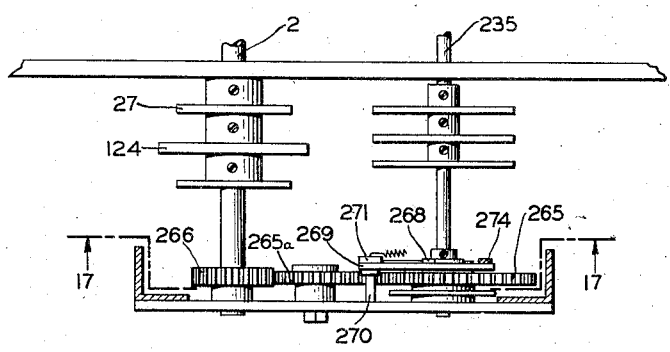
Fig. 18 is a plan view of the total shaft drive control mechanism.

Freely mounted on the total shaft 235 is a toothed disc 265 (see also Figs. 17 and 18) which is continually driven from the main shaft 2 through an intermediate idler gear 265a and a gear 266 secured to the main shaft, the gear ratio being such that the disc 265 makes one revolution to three revolutions of the main shaft 2. The disc 265 is similar to the disc 97 described in U. S. specification No. 2,242,095 and carries three spring loaded latches 267 cooperating with a clutch member 268 secured to the total shaft 235. Cooperating with these latches 267 is a clutch control lever 269 pivoted to the base frame at 270 and rigidly connected to an arm 271 which is urged clockwise by a spring 272 thereby maintaining a shoulder 273 on the lever 269 in the path of the latches 267, whereby as the disc 265 rotates the latches are deflected and do not engage the clutch member 268.

The free end of clutch control lever 269 is connected by a link 274 to the bell crank 255 so that when the bell crank is rocked clockwise by the lug 253 on the ratchet bar 103 the link 274 lifts the lever 269 clear of the latches 267 and consequently one of these latches engages with the clutch member 268 and causes rotation of the total shaft 235.

As long as the bell crank 255 is held rocked by the ratchet bar 103 the lever 269 will be held clear of the latches and the total shaft 235 will continue to rotate. As will be explained below, the arrangement is such that the total shaft makes one complete revolution during three consecutive revolutions of the main shaft 2 and then stops.

It has already been mentioned that during the cycles in which the fields on the card are being sensed the card stop 12 holds the card in sensing position and also the operation of the card picker 9 is suspended.

During the one revolution of the total shaft the mechanism actuated thereby withdraws the card stop and reestablishes the connections between the card picker and its operating mechanism.

The upper end of the card stop 12 is carried in guides (not shown) which keep it in its correct position and the card stop is actuated by a rock arm 279 pivoted thereto and fast on a shaft 280 (Fig. 13) which is rocked by means of a sprung bell crank having its lower arm 281 fixed to the shaft and its upper arm 282 freely mounted thereon. The two arms are sprung together by a spring 283 and their correct relative position is adjusted by a screw 284 and lock nut thereon. The arm 282 carries a roller 285 cooperating with a cam 286 secured to the main shaft 2, whereby at each machine cycle the arm 282 is rocked counterclockwise in Fig. 13.

Fixed to the lower end of the arm 281 is a pin 287 with which cooperates one arm 288 of a bell crank pivoted at 289 to a frame bracket 290 and the upper arm 291 of this bell crank carries a roller 292 cooperating with a cam 293 on the total shaft 235, the roller being maintained in contact with the cam by a spring 296 attached to the bell crank arm 288.

With this arrangement, although the bell crank arm 282 is rocked counterclockwise at each machine cycle, the bell crank arm 288, by standing in the path of the pin 287, prevents movement of the arm 281 so that the shaft 280 is not rocked and accordingly the card stop 12 remains closed.

When the total shaft 235 starts to make its one revolution the cam 293 rocks the bell crank arm 291 thereby removing the arm 288 from the pin 287 so that at the ensuing revolution of the main shaft 2 the rocking of lever 282 rocks lever 281 and the shaft 280 whereby the card stop 12 moves down to open position, thereby releasing the card.

It may here be pointed out that the total shaft starts to rotate while the pin box is in is lowermost position, sensing the card, and that the cam 293 rocks the arm 291 immediately so that, as the pin box rises to transmit the sensed data to the stops, the card stop is opened to release the sensed card. The cam 293 has a relatively short dwell and as soon as the card has been released the card stop moves up again to the closed position.

The card picker 9 is carried on a casting 300 (Fig. 3) mounted in the usual manner to slide to and fro in the magazine 8 and is actuated by a pair of arms 302 (Figs. 3 and 13) each connected by a link 303 to the front end of the casting 300. The arms 302 are secured to a shaft 304 to which is fixed an operating arm 305 having pivoted thereto a link 306 which is forked at its other end at 307 to pass over the main shaft 2 and carries a roller 309 cooperating with a cam 310 secured to the main shaft. The link 306, and therefore the picker 9, are positively actuated by the cam 310, being returned by a spring 311. Fixed to the link 306 is a bracket 312 carrying a square pin 313, and pivoted to the bracket 290 is a bell crank having an upper arm 314 which normally stands in the path of the pin 313. The other arm 315 of the bell crank is urged clockwise in Fig. 13 by a spring 316 whereby a roller 317 on the arm 314 is maintained in contact with a card feed control cam 318 secured to the total shaft 235.

During the one revolution of the total shaft the cam 318 depresses the bell crank arm 314 bringing it clear of the pin 313 so that, on the next revolution of the main shaft 2, the spring 311 is permitted to pull the link 306 forwardly, after which the cam 310 pushes the link back again thereby operating the picker 9 to feed the next card.

As already mentioned the total shaft 235 makes one revolution during three revolutions of the main shaft 2. The revolution of the total shaft commences early in the cycle in which the last field on the card is being sensed. Then follows an idle cycle in which the tens transfer mechanism of the machine is reset if it is operated in the preceding cycle, and thereafter follows the actual total cycle.

The cam 318 is timed to withdraw the bell crank 314 late in the idle cycle, that is, the second of the three cycles corresponding to the one revolution of the total shaft 235, while the cam 310 is timed to actuate the picker early in each cycle so that, following upon the withdrawal of bell crank 314 late in the second cycle, the cam 310 is free to operate the picker in the third cycle and feed the next card into position for sensing in the fourth cycle; that is the cycle next following the total taking cycle.

As already explained, early in the first of the three cycles, the card stop 12 was opened to release the previous card and closed again so that at the time when the next card is fed the card stop is closed to retain it in sensing position.

When the total shaft rotates, the front total shaft 242 is rocked counterclockwise in Fig. 2A. Secured to the shaft 242 is an arm 320 carrying a pin 321 engaging in a slot 322 formed in a link 323 of which the lower end is pivoted to a lever 325 pivoted at 326 to the frame plate 81. When the front total shaft 242 is rocked the pin 321 engages the bottom of the slot 322 after which continued movement of lever 320 pushes the link 323 downwardly and rocks lever 325 counterclockwise.

Lever 325 is disposed above the tails of the two pawls 106 and 107 (Figs. 2A and 7) and in moving downwards lever 325 engages said tails and rocks the pawls counterclockwise thereby disengaging them from the teeth 195 on the ratchet bar 103, whereupon the spring 142 (Fig. 8), acting through arm 143, shaft 98, and arm 99 (Fig. 7) restores the bar 103 to its initial position to the left in Fig. 7. Accordingly lever 269 is also restored and disengages latch 267 from the clutch member 268 whereupon the total shaft stops. A usual form of detent such as that disclosed in U. S. Specification 2,242,095 is provided to ensure that the total shaft stops after having made exactly one revolution.

The total, which is the sum or difference of the items recorded on a single card, may be recorded for example by printing or by punching the total in the same card as that from which the items were sensed.

Mechanism for thus punching the total in the same card forms the subject matter of copending application No. 585,316, now Patent 2,401,671, dated June 4, 1946, of Arthur Thomas and Arthur William Excell and forms no part of the present invention.

When the total shaft 235 makes its one revolution the cam 236 thereon pulls the link 238 downwards and rocks the front total shaft 242 (Figs. 1A and 2A) counterclockwise thereby pulling the side total link 243 to the right in Fig. 2A.

During card reading cycles the links 243 and 211 are over to the left in the position shown in Fig. 2A in which the slot 208 is in engagement in the pin 206.

At 0° in the cycle the link 211 is in its uppermost position and the wheels 150 or 151 are in engagement with the sectors 155. Early in the cycle the link 211 is pulled down thereby rocking shaft 201 counterclockwise and bringing the wheels out of engagement with the sectors. The restoring bar 181 then comes forward allowing the sectors 160 and 155 to take a setting from the stops 180. Link 211 then rises, rocking shaft 201 clockwise, and putting gears 150 or 151 into engagement with the sectors 155. The restoring bar 181 then restores the sectors thereby transferring to the wheels 150 or 151 the amount read from the card.

The total shaft 235 starts to make its revolution early in the last of the cycles in which sensing operations on a card are performed and early in the revolution of the total shaft the card stop cam 293 actuates the card stop 12 and releases the card. The cam 318 however, does not operate the picker to feed the next card until late in the next cycle, which, consequently, is a blank cycle as far as sensing is concerned.

During this blank cycle the wheels 150 or 151 are moved out of engagement with the sectors and then into engagement with the sectors again but nothing is added to or subtracted from them since the zero stops remains raised and maintain the sectors at zero position.

Early in the cycle following the blank cycle the total cam 236 pulls the link 238 downwardly thereby rocking the back total shaft 329 clockwise and the front total shaft 242 counterclockwise (Fig. 2A). The back total shaft withdraws the zero stops in the manner described in the United States specification No. 2,329,677 issued September 14, 1943.

The counterclockwise rocking of the front total shaft 242 pulls the link 243 to the right whereby spring 246 pulls links 211 also to the right until the right hand face of the head 210 engages the pin 207.

Link 211 then descends but, as neither recess 208 or 209 is in engagement with either pin 206 or 207, shaft 201 is not rocked and the wheels 150 or 151 remain in engagement with sectors 155.

Accordingly when the restoring bar 181 releases the sectors the latter move out and turn the accumulator wheels backwards until arrested by the wheels reaching zero. In this manner the total on the wheels is transferred to the sectors and can be printed.

When link 211 reaches the bottom of its stroke and slot 209 registers with pin 207 the spring 246 pulls the link 211 further to the right thereby engaging slot 209 with pin 207. Link 211 then rises thereby rocking shaft 201 counterclockwise and bringing the accumulator wheels out of engagement, the wheels being fully out at about 270° in the total cycle.

During this cycle the next card has been fed into the pin box and at the end of the total cycle the total cam 236 releases the link 238 which is pulled down by a spring, not shown, whereby the back and front total shafts 329 and 242 rock back to their normal positions.

Link 243 is thus returned to the left and spring 251, acting through slide 249 pulls link 211 over to the left until the left hand face of the head 210 engages the pin 206 whereafter spring 251 extends.

Early in the next cycle the next card is sensed and the sectors move out to take a setting from the stops, the wheels being at this time out of engagement. Link 211 descends during this operation until the slot 208 is in register with pin 206 whereupon spring 251, acting through the slot 249, pulls link 211 still further to the left thereby effecting engagement of slot 208 and pin 206.

After the sectors have been set the link 211 rises thereby rocking the shaft 201 clockwise to move the wheels into engagement with the sectors. The sectors are then restored, thus entering the amount read from the new card into the wheels.

If the total is negative it is necessary to shift the abutment 202 into the negative position and for this purpose a negative total cam 330 is secured to the total shaft. This cam is the same as the cam 173 described in U. S. specification No. 2,364,934 issued December 12, 1944 and controls similar mechanism.

Briefly the abutment member 202 is connected by a link 331 to one end of a lever 332 pivoted between its ends to an arm 333 secured to a shaft 334 which is the same as the shaft 168 in specification No. 2,364,934. This shaft 334 is rocked counterclockwise in Fig. 2A from the cam 330 (Fig. 1B) which engages a roller 335 on a link 336 connected to an arm 337 (Fig. 1A) secured to shaft 334.

Associated with lever 332 is a settable stop 338 which can be swung under the free end of lever 332 or clear thereof, as described in British specification 405,666.

When the stop 338 is under the free end of lever 332, the rocking of shaft 334 rocks the arm 333 in a counterclockwise direction, and, as the free end of the lever 332 is held up by the stop 338 the opposite end thereof descends and pushes the link 331 downwards, thereby moving the abutment 202 over into the negative position.

On the other hand, if the stop 338 is withdrawn out of register with the lever 332, the rocking of the shaft 334 merely rotates the lever 332 about the pivot which connects it to the link 331, the abutment member 202 remaining in the positive position.

The stop member 338 is controlled from a pawl 339, which is controlled from the highest denominational wheels 150 and 151, by means of a link 340 which is the same as the link 112 in British specification No. 405,666.

We claim:

1. In a record card controlled machine having an accumulator, a total taking control shaft, a cam on said shaft, means for sensing a record card, and means for transmitting the items sensed in individual sections of a card to said accumulator, the combination of selecting means for successively enabling, in a selected order, a plurality of the total number of corresponding sections of said transmitting means normally inoperative card feeding means, a normally closed card stop, and means operative under the control of said control shaft cam for opening said card stop momentarily to release the sensed card after the last of said selected sections has been enabled, and to render said card feeding means operative to feed a new card after the re-closure of said card stop.

2. In a record card controlled machine having an accumulator, means for sensing a record card, means for transmitting the items sensed in individual sections of a card to said accumulator, and total taking control mechanism for causing said accumulator to yield its total, the combination of selecting means for successively enabling, in a selected order, a plurality of the total number of corresponding sections of said transmitting means, means operative under the control of said selecting means to initiate an operation of the total taking control mechanism immediately the last of said selected sections has been enabled, normally inoperative card feeding means, a normally closed card stop, means operative under the control of the total taking control mechanism to open said card stop momentarily to release the sensed card after the last of said selected sections has been enabled, and means also operative under the control of the total taking mechanism to render the card feeding means operative to feed a new card after the re-closure of said card stop.

3. In a record card controlled machine having a reciprocating sensing pin box, an intermediate pin for and actuable by each pin in said box, the combination of a plurality of shutters, a plurality of columns of intermediate pins, one of said shutters being provided for each column of said intermediate pins and being in an effective position in which it renders its columns of pins inoperative, or in an ineffective position in which it renders its column of pins operative, a latch for each shutter, each of said latches normally locking the associated shutter in the effective position, an actuator common to all said latches, means operative in timed relation with the reciprocations of the pin box to rock said actuator at each of said reciprocations, means also operative in timed relation with the reciprocations of the pin box to advance said actuator step wise, one step at each of said reciprocations, from an initial position to each of a plurality of consecutive positions in turn, a control slide for each latch actuable by said actuator in one of said plurality of consecutive positions, an operative connection between each latch and its control slide, and means for individually setting each of said control slides into any one of a corresponding plurality of consecutive positions, in each of which said control slide is disposed to be operated to release its latch by rocking of the actuator when said actuator is in the corresponding one of its consecutive positions.

4. In a record card controlled machine having a reciprocating pin box, an intermediate pin for and actuable by each pin in said box, the combination of a shutter individual to each of a plurality of columns of intermediate pins, each of said shutters being disposable in an effective position in which it renders its column of pins inoperative, or in an ineffective position in which said column of pins is operative, a latch to each shutter, each of said latches normally locking the associated shutter in the effective position, a control slide for each latch, each of said control slides having a lug, an operative connection between each latch and its control slide, an actuator bail common to all said control slides, means operative in timed relation with the reciprocations of the pin box to rock said actuator bail at each of said reciprocations, means also operative in timed relation with the reciprocations of the pin box to advance said bail stepwise, one step at each of said reciprocations, from an initial position to each of a plurality of consecutive positions in turn, and means for individually setting each of said control slides into any one of a number of consecutive positions in each of which the lug on the control slide is in position to be engaged by the bail when said bail is in the corresponding one of its consecutive positions, whereby at any particular position of the bail the rocking thereof actuates only those control slides which have been set to bring their lugs into operative relation with said bail when said bail is in that particular position.

5. A machine according to claim 4 in which said bail advancing means comprises a toothed ratchet bar, a pawl for operating said bar, means for actuating said pawl at each machine cycle to advance said bar one tooth space, and an operative connection between said bar and said bail whereby said bail is successively advanced with said ratchet bar.

6. In a record card controlled machine having a reciprocating sensing pin box, an intermediate pin for and actuable by each pin in said box, an accumulator, means for transmitting sensed items to said accumulator, a continuously rotatable mainshaft, total taking control mechanism for causing said accumulator to yield its total, a normally stationary total shaft for actuating said total taking control mechanism, and a clutch for connecting said total shaft to said mainshaft, the combination of a plurality of shutters, a plurality of columns of intermediate pins, one of said shutters being provided for each column of said intermediate pins and being in an effective position in which it renders its column of pins inoperative, or in an inffective position in which it renders its column of pins operative, a latch for each shutter, each of said latches normally locking the associated shutter in the effective position, an actuator common to all said latches, means operative in timed relation with the reciprocations of the pin box to rock said actuator at each of said reciprocations, means also operative in timed relation with the reciprocations of said pin box to advance said actuator stepwise, one step at each of said reciprocations, from an initial position to each of a plurality of consecutive positions in turn, a control slide for each latch actuable by said actuator in one of said plurality of consecutive positions, an operative connection between each latch and its control slide, means for individually setting each of said control slides into any one of a corresponding plurality of consecutive positions, in each of which said control slide is disposed to be operated to release its latch by the rocking of the actuator when said actuator is in the corresponding one of its consecutive positions, an arm selectively disposable in the path of advance of said actuator so as to be rocked by movement of said actuator from a predeterminable one of its positions to the next, and an operative connection between said arm and the total shaft clutch to effect engagement of said clutch on rocking of said arm whereby, depending upon the position in which said arm is disposed relative to the initial position of the actuator, a total taking operation is initiated on movement of said actuator from a predeterminable one of its consecutive positions to the next.

7. In a record card controlled machine having a reciprocating sensing pin box, an intermediate pin for and actuable by each pin in said box, an accumulator, means for transmitting sensed items to said accumulator, a continuously rotatable mainshaft, total taking control mechanism for causing said accumulator to yield its total, a normally stationary total shaft for actuating said total taking control mechanism, a clutch for connecting said total shaft to said mainshaft, the combination of a plurality of shutters, a plurality of columns of intermediate pins, one of said shutters being provided for each column of said intermediate pins and being in an effective position in which it renders its column of pins inoperative, or in an ineffective position in which it renders its column of pins operative, a latch for each shutter, each of said latches normally locking the associated shutter in the effective position, a control slide for each latch, each of said control slides having a lug, an operative connection between each latch and its control slide, an actuator bail common to all said control slides, means operative in timed relation with the reciprocations of the pin box to rock said actuator bail at each of said reciprocations, means also operative in timed relation with the reciprocations of said pin box to advance said bail stepwise, one step at each of said reciprocations, from an initial position to each of a plurality of consecutive positions in turn, and means for individually setting each of said control slides into any one of a number of consecutive positions, in each of which the lug on the control slide is in position to be engaged by the bail when said bail is at the corresponding one of its consecutive positions, a total control member movable with said bail, an arm selectively disposable in the path of said total control member so as to be engaged and rocked by said control member on movement of said bail from a predeterminable one of its positions to the next, and an operative connection between said arm and the total shaft clutch to effect engagement of said clutch on rocking of said arm.

8. A machine according to claim 7 in which said bail advancing means includes a toothed ratchet bar, a pawl for operating said bar, means for actuating said pawl at each machine cycle to advance said bar one tooth space, and an operative connection between said bar and said bail whereby said bail is successively advanced with said ratchet bar, and wherein the total control member is constituted by a lug on said ratchet bar.

9. In a record card controlled machine having an accumulator, means for sensing different sections of a card, means for transmitting the items sensed in each section to said accumulator, and total taking control mechanism for causing said accumulator to yield its total, the combination of selecting means for successively enabling in a selected order, a plurality of the total number of sections of said transmitting means, means operative under the control of said selecting means to initiate an operation of the total taking control mechanism immediately the last of said selected sections has been enabled, a card feeding picker, means tending to actuate said picker at each machine cycle, a latch normally holding said picker inoperative, a card stop, means tending to open said card stop at each machine cycle, a latch normally holding said card stop closed, and means operative under the control of the total taking control mechanism to render both said latches ineffective at each operaion of said total taking control mechanism.

10. In a record card controlled machine having an accumulator, means for repeatedly sensing sections of a record card, and means for transmitting the items sensed in each card section to said accumulator, the combination of latches to hold said transmitting means disabled, means settable to limit the total number of sensings of a card, and settable section selecting means including a member operable to successively trip said latches and to enable, in a selected order, one section of said transmitting means during successive sensings of a card, the movement of said operable member being controlled by said limit means.

11. In a record card controlled machine having an accumulator, a pin box including a plurality of reciprocating pins for sensing record cards, a normally closed card stop for holding a card stationary relative to said pins during a plurality of consecutive reciprocations thereof including a latch, transmission means from individual sections of said pin box to said accumulator, the combination of a total taking control shaft, a cam on said shaft adapted to render said latch ineffective and momentarily open said card stop after a selected number of consecutive reciprocations of said pins, and section selecting means operatively associated with said control means for rendering a different section of said transmission means operative during consecutive reciprocations of said pins.

12. In a record card controlled machine having an accumulator, means for repeatedly sensing sections of a record card, means for transmitting the items sensed in individual sections of a card to said accumulator, and total taking control mechanism including a total taking control shaft, a cam on said shaft for causing said accumulator to yield its total, the combination of section selecting means including a member operable for successively enabling in a selected order one of a plurality of corresponding sections of said transmitting means, and means operatively associated with said enabling means for initiating an operation of said total taking control shaft immediately upon the transmission of sensed data through the last selected section of said transmitting means.

13. In a record card controlled machine having an accumulator, means for repeatedly sensing sections of a record card, means for transmitting the items sensed in individual sections of a card to said accumulator, and total taking control mechanism including a total taking control shaft, a cam on said shaft for causing said accumulator to yield its total, the combination of section selecting means including a member movable for successively enabling in a selected order one of a plurality of corresponding sections of said transmitting means, and means controlled by the operation of said movable member, and settable to initiate an operation of said total taking control shaft immediately upon the transmission of sensed data through the last selected section of said transmitting means.

ARTHUR THOMAS.
ALFRED HERRMANN GAUSDEN.

REFERENCES CITED

The following references are of record in the file of this patent:

UNITED STATES PATENTS

| Number | Name | Date |
|---|---|---|
| 2,093,529 | Tauschek | Sept. 21, 1937 |
| 2,240,667 | Paris | May 6, 1941 |
| 2,290,827 | Thomas | July 21, 1942 |

FOREIGN PATENTS

| Number | Country | Date |
|---|---|---|
| 473,757 | Great Britain | Oct. 18, 1937 |